(12) United States Patent
Leek et al.

(10) Patent No.: US 8,281,551 B2
(45) Date of Patent: Oct. 9, 2012

(54) CORRUGATED SHEARWALL

(75) Inventors: William F. Leek, Carmel, CA (US); Jose L. Perez, San Leandro, CA (US); Jerry G. Gridley, Grass Valley, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 13/094,638

(22) Filed: Apr. 26, 2011

(65) Prior Publication Data

US 2011/0197544 A1  Aug. 18, 2011

Related U.S. Application Data

(63) Continuation of application No. 12/835,639, filed on Jul. 13, 2010, now abandoned, which is a continuation of application No. 10/734,870, filed on Dec. 12, 2003, now abandoned.

(51) Int. Cl.
*E04C 2/32* (2006.01)
*E04C 2/38* (2006.01)

(52) U.S. Cl. ... 52/798.1; 52/764; 52/800.12; 52/800.17; 52/671; 52/674; 52/840; 52/848; 52/851; 52/295; 52/713

(58) Field of Classification Search .......... 52/798.1, 52/800.1–800.12, 801.1, 801.11, 802.2, 783.11, 52/783.17, 783.18, 783.19, 745.19, 747.1, 52/745.05, 745.09, 748.11, 710–713, 698, 52/840, 653.1, 79.1, 79.12, 79.13, 292, 294, 52/293.1, 506.03, 506.04, 474, 764–767, 52/800.17, 800.18, 670–674, 848–851
See application file for complete search history.

(56) References Cited

U.S. PATENT DOCUMENTS

| | | | |
|---|---|---|---|
| 140,526 A | | 7/1879 | Munson |
| 390,732 A | | 10/1888 | Weston |
| 665,718 A | * | 1/1901 | Armstrong .................... 52/838 |
| 1,331,412 A | * | 2/1920 | Brown ....................... 296/204 |
| 1,351,614 A | * | 8/1920 | Brown ......................... 52/840 |
| 1,417,664 A | * | 5/1922 | Garlinghouse ............. 249/189 |
| RE17,095 E | * | 10/1928 | Small ......................... 105/410 |
| 1,849,273 A | | 3/1932 | Broderick |

(Continued)

FOREIGN PATENT DOCUMENTS

CA  2196869 A1  7/1995

(Continued)

OTHER PUBLICATIONS

Official Action dated Apr. 18, 2011 in Japanese Patent Application No. 2004-382518.

(Continued)

*Primary Examiner* — Jeanette E. Chapman
(74) *Attorney, Agent, or Firm* — Vierra Magen Marcus & DeNiro LLP

(57) ABSTRACT

A prefabricated shearwall including a central diaphragm having a height generally defined by top and bottom edges, and a width generally defined by a pair of end sections. The diaphragm further includes at least one corrugation extending in the height direction at least partially between the top and bottom edges. The corrugation increases the ductility and ability of the shearwall to withstand lateral forces such as those generated in earthquakes, high winds, floods and snow loads.

16 Claims, 11 Drawing Sheets

U.S. PATENT DOCUMENTS

| | | | |
|---|---|---|---|
| 1,895,667 A | 1/1933 | Junkers | |
| 2,191,804 A | 2/1940 | O'Malley | |
| 2,263,214 A | 11/1941 | Larkin | |
| 2,576,530 A | 11/1951 | Medal | |
| 2,742,114 A | 4/1956 | Behlen | |
| 3,037,593 A | 6/1962 | Webster | |
| 3,143,827 A | 8/1964 | Showalter | |
| 3,172,509 A | 3/1965 | Dugger | |
| 3,254,464 A | 6/1966 | Hoyt, Jr. | |
| 3,300,926 A * | 1/1967 | Heirich | 52/300 |
| 3,360,892 A | 1/1968 | Rosso | |
| 3,452,501 A * | 7/1969 | Sickler et al. | 52/798.1 |
| 3,568,388 A * | 3/1971 | Flachbarth et al. | 52/588.1 |
| 3,633,327 A | 1/1972 | Klingensmith et al. | |
| 3,657,849 A | 4/1972 | Garton | |
| 3,658,388 A | 4/1972 | Hasegawa | |
| 3,724,078 A | 4/1973 | Carlin et al. | |
| 3,820,295 A | 6/1974 | Folley | |
| 3,854,253 A | 12/1974 | Slowbe | |
| 3,963,099 A | 6/1976 | Skinner et al. | |
| 4,037,379 A | 7/1977 | Ozanne | |
| 4,037,381 A | 7/1977 | Charles | |
| 4,182,080 A | 1/1980 | Naylor | |
| 4,220,423 A | 9/1980 | Sivachenko | |
| 4,276,166 A * | 6/1981 | Muller et al. | 210/327 |
| 4,292,782 A | 10/1981 | Schaeffer | |
| 4,309,853 A | 1/1982 | Lowe | |
| 4,546,590 A | 10/1985 | Finch | |
| 4,563,851 A | 1/1986 | Long | |
| 4,603,531 A | 8/1986 | Nash | |
| 4,648,216 A | 3/1987 | Reaves et al. | |
| 4,709,519 A | 12/1987 | Liefer et al. | |
| 4,726,166 A | 2/1988 | DeRees | |
| 4,736,566 A | 4/1988 | Krotsch | |
| 4,937,993 A | 7/1990 | Hitchins | |
| 5,056,577 A * | 10/1991 | DeLong et al. | 160/135 |
| 5,070,661 A | 12/1991 | Lo Guidici | |
| 5,345,716 A | 9/1994 | Caplan | |
| 5,388,358 A | 2/1995 | Mazhar | |
| 5,390,466 A | 2/1995 | Johnson et al. | |
| 5,426,893 A | 6/1995 | Hoffman | |
| 5,553,437 A | 9/1996 | Navon | |
| 5,579,615 A | 12/1996 | Hoffman | |
| 5,581,969 A | 12/1996 | Kelleher | |
| 5,617,693 A | 4/1997 | Hefner | |
| 5,619,837 A * | 4/1997 | DiSanto | 52/798.1 |
| 5,628,495 A | 5/1997 | Gandara | |
| 5,664,388 A | 9/1997 | Chapman et al. | |
| 5,706,614 A | 1/1998 | Wiley | |
| 5,706,626 A | 1/1998 | Mueller | |
| 5,729,950 A | 3/1998 | Hardy | |
| 5,862,639 A | 1/1999 | Abou-Rached | |
| 5,870,870 A | 2/1999 | Utzman | |
| 5,904,025 A | 5/1999 | Bass et al. | |
| D411,021 S | 6/1999 | Chapman et al. | |
| 5,996,292 A | 12/1999 | Hill et al. | |
| 6,067,769 A | 5/2000 | Hardy | |
| 6,073,413 A | 6/2000 | Tongiatama | |
| 6,076,320 A * | 6/2000 | Butler | 52/294 |
| 6,079,168 A | 6/2000 | Shaver | |
| 6,185,898 B1 | 2/2001 | Pratt | |
| 6,205,725 B1 | 3/2001 | Butler | |
| 6,212,849 B1 | 4/2001 | Pellock | |
| 6,240,695 B1 | 6/2001 | Karalic et al. | |
| 6,250,029 B1 | 6/2001 | Jeffers et al. | |
| 6,260,323 B1 | 7/2001 | Hockey | |
| 6,298,612 B1 | 10/2001 | Adams | |
| 6,298,617 B1 * | 10/2001 | de Quesada | 52/236.3 |
| 6,345,476 B1 | 2/2002 | Hill | |
| 6,385,942 B1 | 5/2002 | Grossman et al. | |
| 6,481,175 B2 | 11/2002 | Potter | |
| 6,484,460 B2 | 11/2002 | VanHaitsma | |
| 6,502,357 B1 | 1/2003 | Stuthman et al. | |
| 6,560,940 B2 | 5/2003 | Mueller | |
| 6,615,896 B1 | 9/2003 | Andalia | |
| 6,668,508 B2 | 12/2003 | Boone et al. | |
| 6,761,001 B2 | 7/2004 | Mueller | |
| 6,877,285 B2 | 4/2005 | Poma et al. | |
| 7,251,920 B2 | 8/2007 | Timmerman | |
| 2003/0009964 A1 | 1/2003 | Trarup et al. | |
| 2003/0230506 A1 * | 12/2003 | Smarr et al. | 206/397 |
| 2005/0126105 A1 | 6/2005 | Leek et al. | |
| 2005/0284073 A1 | 12/2005 | Leek et al. | |
| 2007/0062135 A1 | 3/2007 | Mueller | |
| 2010/0275540 A1 | 11/2010 | Leek et al. | |

FOREIGN PATENT DOCUMENTS

| | | |
|---|---|---|
| EP | 1211361 A1 | 6/2002 |
| GB | 2315288 A | 1/1998 |
| JP | 54087616 | 6/1979 |
| JP | 02049449 | 4/1990 |
| JP | 03199550 | 8/1991 |
| JP | 3199550 A | 8/1991 |
| JP | 11229490 A | 8/1999 |
| JP | 2003293487 | 10/2003 |
| JP | 2003293487 A | 10/2003 |

OTHER PUBLICATIONS

Official Action dated Jun. 16, 2011 in Canadian Patent Application No. 2,489,845.
European Office Action dated Jul. 21, 2010 in European Patent Application No. 04257722.1.
Office Action dated May 4, 2006 in U.S. Appl. No. 10/734,870.
Response to Office Action filed Sep. 5, 2006 in U.S. Appl. No. 10/734,870.
Office Action dated Nov. 17, 2006 in U.S. Appl. No. 10/734,870.
Response to Office Action filed Mar. 14, 2007 in U.S. Appl. No. 10/734,870.
Office Action dated Jun. 4, 2007 in U.S. Appl. No. 10/734,870.
Response to Office Action filed Oct. 3, 2007 in U.S. Appl. No. 10/734,870.
Office Action dated Jun. 24, 2008 in U.S. Appl. No. 10/734,870.
Response to Office Action filed Dec. 24, 2008 in U.S. Appl. No. 10/734,870.
Office Action dated Apr. 2, 2009 in U.S. Appl. No. 10/734,870.
English Abstract of Foreign Reference JP3199550, Published Aug. 30, 1991, Applicant Asahi Chemical Ind.
English Abstract of Foreign Reference JP11229490, Published Aug. 27, 1999, Applicant Suda Takanori.
English Abstract of Foreign Reference JP2003293487, Published Oct. 15, 2003, Applicant American Silverwood KK;Kirii Construction Material.
"Temblor spurs builder to create anti-quake frame", Daily Press, Victorville, CA, Apr. 26, 1999.
The Hardy Frame, "An Alternative to Plywood Shear Walls for Earthquake and Wind Resistance!"
LBN-Light Beam Inc., Steel Homes, Santa Monica, CA, Jul. 1995.
Office Action dated May 7, 2009 in U.S. Appl. No. 11/008,015.
Response to Office Action filed Oct. 7, 2009 in U.S. Appl. No. 11/008,015.
Office Action dated Nov. 25, 2009 in U.S. Appl. No. 11/008,015.
Response to Office Action filed Oct. 2, 2009 in U.S. Appl. No. 10/734,870.
Office Action dated Jan. 13, 2010 in U.S. Appl. No. 10/734,870.
Office Action dated Mar. 5, 2008 in U.S. Appl. No. 11/008,015.
Response to Office Action filed Jul. 2, 2008 in U.S. Appl. No. 11/008,015.
Office Action dated Nov. 10, 2008 in U.S. Appl. No. 11/008,015.
Response to Office Action filed Feb. 10, 2009 in U.S. Appl. No. 11/008,015.
Office Action dated Jul. 2, 2010 in Japanese Patent Application No. 2004-382518.
Partial English translation of Office Action dated Jul. 2, 2010 in Japanese Patent Application No. 2004-382518.
English translation of Abstract of Publication No. JP02049449 published Apr. 5, 1990.
Patent Abstracts of Japan (in English) of Publication No. JP2003293487 published Oct. 15, 2003.
Patent Abstracts of Japan (in English) of Publication No. JP03199550 published Aug. 30, 1991.

English translation of Abstract of Publication No. JP54087616 published Jun. 21, 1979.
Patent Abstracts of Japan (in English) of Publication No. JP11229490 published Aug. 24, 1999.
Response to Office Action filed Jan. 12, 2011 in Japanese Patent Application No. 2004-382518.
Response to Office Action filed Jan. 31, 2011 in European Patent Application No. 04257722.1.
Office Action dated Oct. 26, 2010 in U.S. Appl. No. 12/835,630.
Response to Offical Action filed Oct. 17, 2011 in Japanese Patent Application No. 2004-382518.
A. Astaneh-Asl, "Seismic Behavior and Design of Steel Shear Walls," Steel TIPS, Structural Steel Educational Council Technical Information and Product Services (Jan. 2001).
M. Elgaaly, "Thin Steel Plate Shear Walls Behavior and Analysis," 32 Thin-Walled Structures 151-180 (1998).
A. Astaneh-Asl, "Seismic Behavior and Design of Steel Shear Walls," SEAONC Seminar, Paper Distributed and Presented at the 2001 SEAONC Seminar, Structural Engineers Association of Northern California (Nov. 2001).
A. Astaneh-Asl, "Steel Plate Shear Walls," U.S.—Japan Workshop on Seismc Fracture Issues in Steel Structures (Feb. 2000).
L. Louca and J. Friis, "Modelling Failure of Welded Connections to Corrugated Panel Structures Under Blast Loading," Imperial College of Science, Technology and Medicine, Deparent of Civil and Environmental Engineering, South Kensington, London, United Kingdom, Offshore Technology Report 20001088 (2001).
Y. Mo and S. Perng, "Behavior of Framed Shearwalls Made of Corrugated Steel Under Lateral Load Reversals," Advances in Structural Engineering, vol. 3 No. 3 (2000).
C. Miller, "Light Gage Steel Infill Panels in Multistory Steel Frames," Engineering Journal, American Institute of Steel Construction (1974).
Y. Takahashi, T. Takeda, Y. Takemoto and M. Takagi, Experimental Study on Thin Steel Shear Walls and Particular Steel Bracings Under Alternative Horizontal Load, Structural Engineering Laboratory, Technical Research Institute, Ohbayashi-Gumi Ltd., Tokyo, Japan, published in the International Association for Bridge and Structural Engineering Symposium: Resistance and Ultimate Deformability of Structures Acted on by Well Defined Repeated Loads (1973).
Butler Manufacturing Company, A Century of Excellence, Building Profit: vol. 21, No. 1 (Spring 2001).
Y. Kawai, R. Kanno, N. Uno and Y. Sakumoto, "Seismic Resistance and Design of Steel-Framed Houses," Nippon Steel Technical Report No. 79 (Jan. 1999).
V. Caccese, M. Elgaaly and R. Chen, "Experimental Study of Thin Steel-Plate Shear Walls Under Cyclic Load," 119 Journal of Structural Engineering 573-87, ASCE (Feb. 1993).
M. Elgaaly and Y. Liu, "Analysis of Thin-Steel-Plate Shear Walls," 123 Journal of Structural Engineering, 1487-96 (Nov. 1997).
M. Elgaaly, V. Caccese and C. Du, "Postbuckling Behavior of Steel-Plate Shear Walls Under Cyclic Loads," 119 Journal of Structural Engineering, 588-605 (Feb. 1993).
M. Elgaaly and V. Caccese, "Steel Plate Shear Walls," Proceedings of the 1990 National Steel Construction Conference, American Institute of Steel Construction (AISC) (1990).
P. Timler, "Design Evolution and State-of-the-Art Development of Steel Plate Shear Wall Construction in North America," Structural Engineers Association of California, (SEAOC Proceedings, Proceedings of the 69th Annual Convention (Aug. 2000).
G. Kulak, D. Kennedy, R. Driver and M. Medhekar, "Steel Plate Shear Walls—An Overview," Engineering Journal 50-62 (First Quarter 2001).
R. Driver, G. Kulak, A. Elwi, D. Kennedy, "FE and Simplified Models of Steel Plate Shear Wall," 124 Journal of Structural Engineering 121-30 (Feb. 1998).
R. Driver, G. Kulak, D. Kenney and A. Elwi, "Cyclic Test of Four-Story Steel Plate Shear Wall," 124 Journal of Structural Engineering 112-20(Feb. 1998).
M. Elgaaly and A. Seshadri, "Steel Built-Up Girders with Trapezodially Corrugated Webs," Engineering Journal 1-11 (First Quarter 1998).
T. Yamaguchi, Y. Nakata, T. Takeuschi, T. Ikebe, T. Nagao, A. Minami, T. Suzuki, "Seismic Control Devices Using Low-Yield-Pornt Steel," Nippon Technical Report No. 77, 78 (Jul. 1998).
W. Chen, Handbook of Structural Engineering, CRC Press (1997).
H. Akiyama, Earthquake-Resistant Limit-State Design for Buildings, University of Tokyo Press (1985).
G. Hancock, T. Murray and D. Ellifritt, Cold-Formed Steel Structures to the AISI Specification, Marcel Dekker, Inc. (2001).
Canadian Standards Association, "Limit States Design of Steel Structures," (Dec. 2001).
U.S. Appl. No. 09/897,740 for Corrugated Diaphragm Shear Panel filed Jun. 29, 2001.
Memarzadeh et al., Steel and Composite Structures, vol. 10, No. I (2010) 87-108.
Astaneh-Asl, Steel TIPS, Structural Steel Education Council, May 2002, pp. 1-49.
Steigmann, Proceedings of the Royal Society of London. Series A, Mathematical and Physical Sciences, vol. 429, No. 1876. (May 8, 1990), pp. 141-173.
W. Pan & K.S. Sivakumaran, "Cyclic Response of Metal-Clad Wood-Framed Shear Walls", Proceedings of the Third International Conference on Thin-Walled Structures, (Elsevier 2001).
Acsys Panels website "Panelized Building System—Teclmical Info. and Specifications", http://www.acsvs.netlteclmical-info-soecs.htm, Jun. 7, 2010.
Acsys Panels website Panel Building System—Seminar to SIP (Structural Insulated Panel)—Acsys, Inc., http://www.acsvs.netlConnection-Details-index.htm, Jun. 7, 2010.
Acsys Panels website "Panel Building System—benefits—construction benefits—owner benefits", http://www.acsvs.netloanel-overview-benefits.htm, Jun. 7, 2010.
Acsys Installation Guide v.3.0, "ACSYS Panelized Building System Installation Guide", 2005.
ICC-ES Legacy Report PFC-5881, Reissued Apr. 1, 2005.
Acsys Panel Specifications, date unknown.
Acsys Installation Details, Rev. Date Dec. 11, 2007.
Koreteck Installation Guide v.I.5, date unknown.
Koreteck Installation Details, Rev. Date Feb. 28, 2007.
Light Beam System—LBN Shear Panel; Jan. 1997.
Light Beam Panel Specification Sheet, Feb. 11, 1996.
Light Beam System—News Release, Sep. 1996.
Al Cornmings Memo, Shearwall/Holdown Testing, Preliminary Observations, Jun. 6, 1996.
Light Beam System—Light Beam Header, date unknown.
Quinton Bowles, UMKC Institute, Observer's Report of Diaphragm Strength and Stiffness of the Butlerib II Roof and Wall Panels, 1984.
Butlerib II Wall Panel Design Data, 1984.
Butlerib II Wall System Flyer, date unknown.
Butlerib II Wall System Specifications, Jun. 1992.
Carl E. Kurk, University of Kansas, Butierib II Diaphragm Tests, Aug. 7, 1985.
Sheet Metal Perimeter Foundation Anchorpanel Information Sheet, 2002.
ICC Evaluation Report in Progress, Application No. 01-05-15; date unknown.
Anchorpanel Summary, http://www.fasttrackfoundations.com/method.html, Mar. 6, 2001.
Fast Track Foundation Systems, http://www.fasttrackfoundations.com, Aug. 29, 2000.
Anchorpanel Panel Shelter System, http://fasttrackfoundations.com/tornado.html, Mar. 6, 2001.
Anchorpanel Custom and Spec Homes, http://fasttrackfoundations.com/custom.html, Mar. 6, 2001.
Anchorpanel Retrofit Foundations, http://fasttrackfoundations.com/retrofit.html, Mar. 6, 2001.
Anchorpanel Perimeter Foundations, http://www.fasttrackfoundations.com/manuf.html, Oct. 2, 2000.
Anchor Panel Foundation System Installation Diagram, date unknown.
Defendant's First Amended Invalidity Contentions filed in Civil Action No. 2:09-CV-337-CE and 2:1O-CV-082-CE.
Original Complaint for Patent Infringement filed Oct. 28, 2009 in Civil Action No. 2:09-CV-337-CE.
Defendant's Invalidity Contentions filed in Civil Action No. 2:09-CV-337-CE and 2:1O-CV-082-CE.
Response to Office Action filed Jun. 16, 2011 in Canadian Patent Application No. 2,489,845.

* cited by examiner

CORRUGATED SHEARWALL

PRIORITY CLAIM

The present application is a continuation of U.S. patent application Ser. No. 12/835,639, entitled CORRUGATED SHEARWALL, filed Jul. 13, 2010, now pending, which is a continuation of U.S. patent application Ser. No. 10/734,870, entitled CORRUGATED SHEARWALL, filed Dec. 12, 2003, now abandoned.

BACKGROUND OF THE INVENTION

1. Field of the Invention

The present invention relates to a shearwall for opposing lateral forces on building walls, and in particular to a prefabricated shearwall including a central diaphragm having a corrugated or non-planar cross section to improve the ability of the shearwall to withstand lateral forces such as those generated in earthquakes, high winds, floods and snow loads.

2. Description of the Related Art

Shearwalls were developed to counteract the potentially devastating effects of natural phenomena such as seismic activity, high winds, floods and snow loads on the structural integrity of light-framed constructions. Prior to shearwalls and lateral bracing systems, lateral forces generated during these natural phenomena often caused the top portion of a wall to move laterally with respect to the bottom portion of the wall, which movement could result in structural failure of the wall and, in some instances, collapse of the building. Shearwalls within wall sections of light-framed constructions provide lateral stability and allow the lateral forces in the wall sections to be transmitted through the shearwalls between the upper portions of the wall and the floor diaphragm or foundation of the building where they are dissipated without structural effect on the wall or building.

In constructions such as residences and small buildings, a lateral bracing system typically includes vertical studs spaced from each other and affixed to horizontal top and bottom plates. The bottom plate is typically anchored to the floor diaphragm or foundation. The bracing system typically further includes sheathing affixed to the studs, upper plate and/or lower plate to increase structural response to lateral forces. The sheathing used is generally oriented strand board (OSB) or plywood, but fiberboard, particleboard and drywall (gypsum board) are also used. Alternatively or additionally, light-frame construction wall sections may include prefabricated shearwall sections, which can be positioned between the vertical studs and affixed to the studs and the top and bottom connecting plates. The sheathing or prefabricated panels can also be placed adjacent door and window frames to improve the response to lateral forces at these locations.

A conventional prefabricated shearwall 20 is shown in the perspective and cross-sectional views in FIGS. 1 and 2. The shearwall includes an interior diaphragm 22 formed of thin gauge sheet steel which is affixed to an exterior wooden frame (not shown). The diaphragm is conventionally planar with the edges along the length of the diaphragm being formed to respective lips 26 and 28. The lips 26, 28 allow the diaphragm to be affixed to the wooden frame.

While a prefabricated shearwall of the construction shown in FIGS. 1 and 2 provides lateral force response and resistance, it has limitations with respect to its lateral load bearing capabilities. There is, therefore, a need for an improved shearwall capable of withstanding greater lateral loads.

SUMMARY OF THE INVENTION

It is therefore an advantage of the present invention to provide a shearwall having improved lateral load bearing characteristics relative to similarly sized shearwalls.

It is another advantage of the present invention to provide a shearwall having improved lateral load bearing characteristics without adding to the size or materials used relative to conventional shearwalls.

It is another advantage of the present invention to provide a shearwall having improved lateral load bearing characteristics which may be easily retrofit into existing structures.

These and other advantages are provided by the present invention which in preferred embodiments relates to a prefabricated shearwall including a central diaphragm having a height generally defined by top and bottom edges, and a width generally defined by a pair of end sections. The diaphragm further includes at least one corrugation extending in the height direction at least partially between the top and bottom edges. The corrugation increases the cross-sectional area and ductility of the diaphragm in the lateral direction in comparison to conventional shearwalls, and further improves the resistance of the shearwall to lateral forces such as those generated in earthquakes, high winds, floods and snow loads.

In embodiments of the invention, the shearwall may further include a pair of reinforcing chords affixed to the end sections of the central diaphragm. The chords may be formed of 2 inch×4 inch wooden studs having a height equal to that of the central diaphragm. The chords further improve the resistance of the shearwall to lateral forces.

In order to distribute the significant compressive forces exerted by the shearwall over a large surface area on the underlying support surface, the shearwall further includes a flat sill plate affixed to the bottom edge of the central diaphragm. In embodiments of the invention, the sill plate may have a footprint at least equal to that of the central diaphragm, the chords and any sheathing affixed to the shearwall. The sill plate may be formed of a rigid material such as steel to evenly distribute any localized compressive forces from the shearwall. The sill plate may also underlie the chords to prevent any wetness or moisture from the underlying support surface from damaging the chords.

While a preferred embodiment of the invention includes a central diaphragm with a corrugation having a constant size and shape from the top edge to the bottom edge, the corrugation may be formed so that it is larger at the bottom edge of the central diaphragm and slopes inward to become smaller toward the top edge of the central diaphragm (or visa-versa). This results in a shearwall providing even greater lateral force resistance, as the sloped lines defined by the bends at the intersection between the various diaphragm sections have lateral components that exhibit increased resistance to movement in the lateral direction.

BRIEF DESCRIPTION OF THE DRAWINGS

The present invention will now be described with reference to the drawings in which.

DETAILED DESCRIPTION

The present invention will now be described with reference to FIGS. 3 through 31, which in embodiments relate to a prefabricated shearwall panel including a central diaphragm having a non-planar cross-section to improve the lateral load bearing characteristics of the panel. It is understood that the present invention may be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
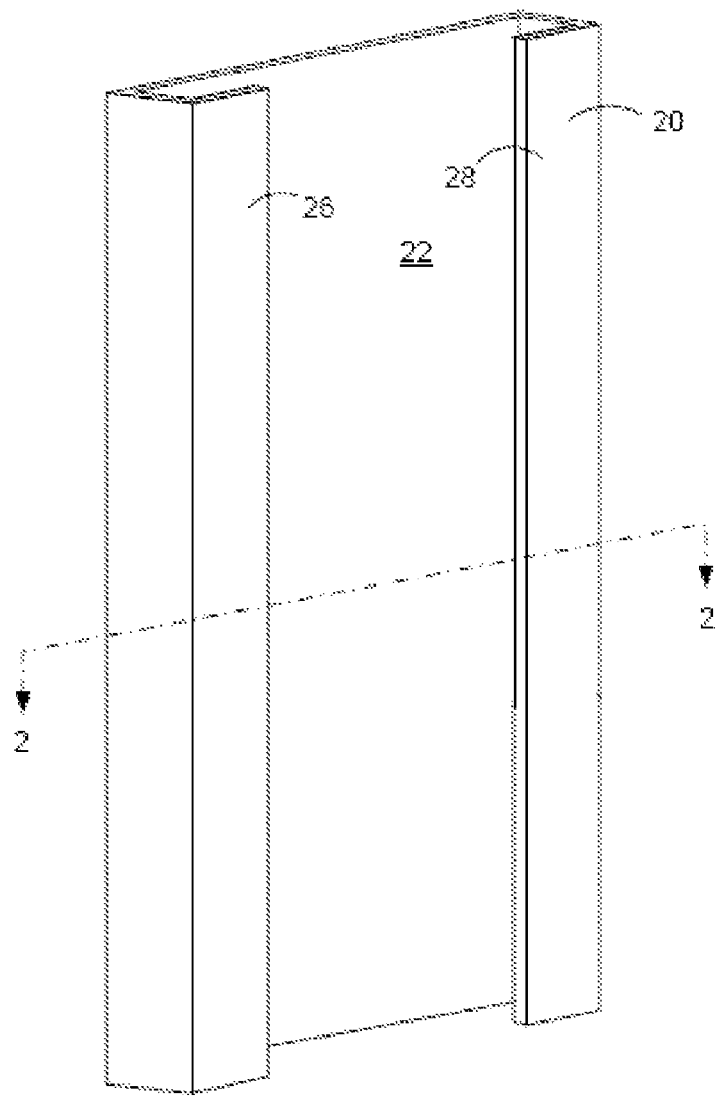
FIG. 1 is a perspective view of a prefabricated shearwall panel according to the prior art.
Figure 2:
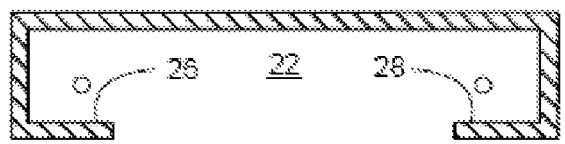
FIG. 2 is a cross-sectional view through line 2-2 of FIG. 1 showing the prefabricated shearwall panel according to the prior art.
Figure 3:
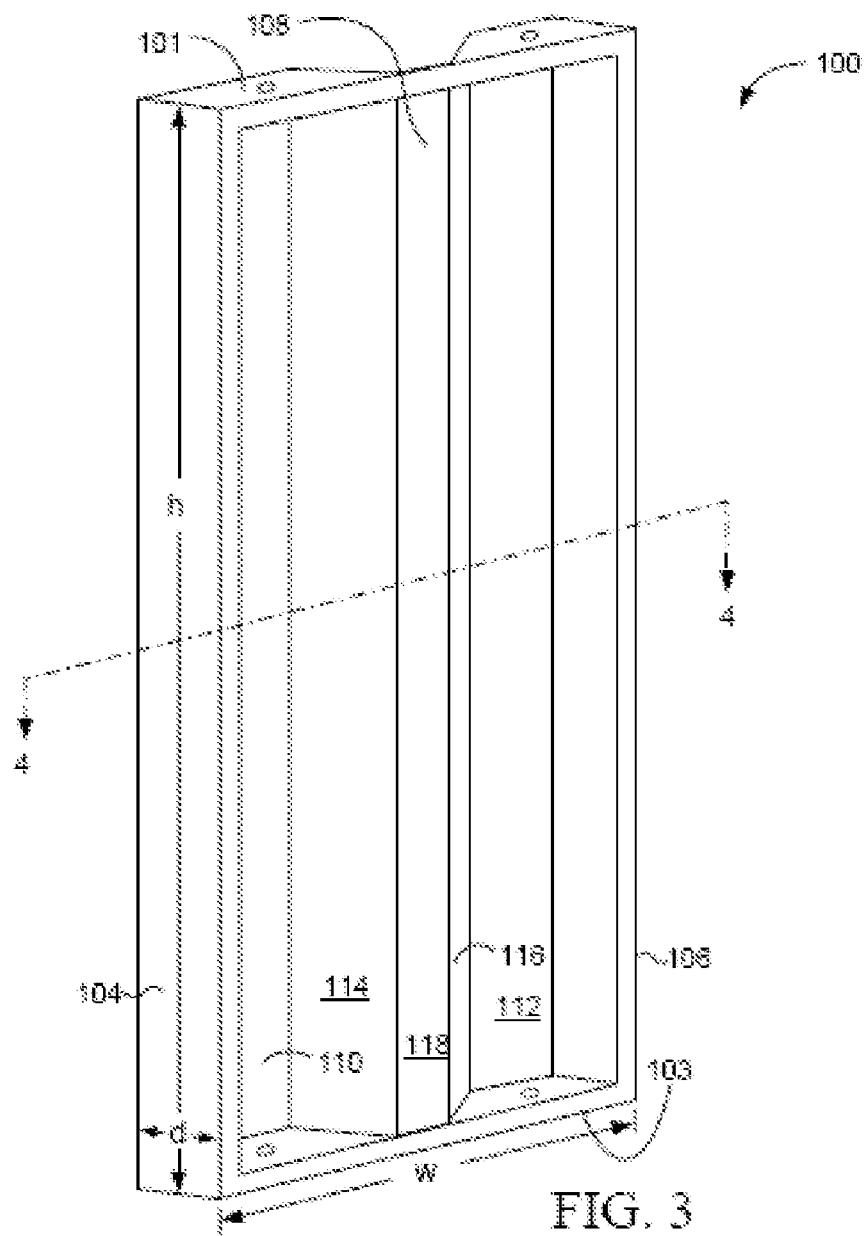
FIG. 3 is a perspective view of a prefabricated shearwall according to an embodiment of the present invention.
Figure 4:
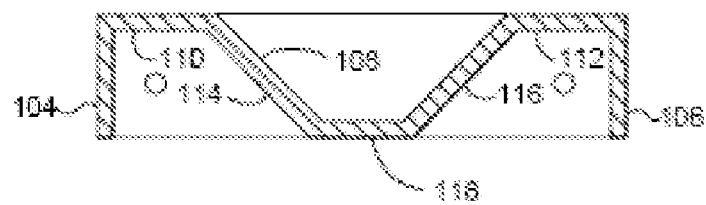
FIG. 4 is a cross-sectional view through line 4-4 of FIG. 3 showing the prefabricated shearwall according to the present invention.

Referring now to FIGS. 3 through 4, there is shown a prefabricated shearwall 100 according to the present invention. The shearwall 100 includes a central diaphragm 102 having a height, width, and depth, each perpendicular to each other and denoted as h, w and d, respectively, in FIG. 4. In embodiments of the present invention, the central diaphragm 102 includes a top edge 101 and a bottom edge 103 generally defining the height of the central diaphragm, and a pair of end sections 104 and 106 generally defining the width of the central diaphragm. The diaphragm 102 further includes a corrugation 108 defined by rear planar sections 110 and 112, angled sections 114 and 116, and front planar section 118. While the corrugation 108 is shown comprised of planar sections joined at angles with respect to each other, it is understood that the corrugation 108 may have different configurations in alternative embodiments. As used herein, a corrugation may be any ridge, groove or angle formed in central diaphragm 102 extending in the height direction at least partially between the top edge 101 and the bottom edge 103. The ridge, groove or angle lies in between the end sections 104, 106 in a plane different from that of an adjacent section which also extends in the height direction between the top and bottom edges 101, 103 in between the end sections 104, 106.

Some alternative embodiments of the central diaphragm are shown in FIGS. 7 through 28 and discussed hereinafter. In addition to adding increased resistance to compressive loads (i.e., those parallel to the diaphragm height), the corrugation 108 increases the cross-sectional area and its ability to withstand lateral forces (i.e., those parallel to the diaphragm width). Moreover, the corrugation 108 provides increased ductility to the shearwall in the lateral direction.

In embodiments of the present invention, the central diaphragm may have an overall height of 93¼ inches, an overall width of 12 inches, and a depth of 2½ inches. It is understood that each of these dimensions may be varied in alternative embodiments, both proportionately and disproportionately with respect to each other. For example, in one alternative embodiment, the central diaphragm may have an overall width of 18 inches. Each of the sections 104, 106 and 110 through 118 is preferably the same height. In embodiments where the overall width is 12 inches, end sections 104 and 106 may each be 2½ inches wide, rear planar sections 110 and 112 may each be 3 inches wide, the angled sections 114 and 116 may each be 4¼ inches wide, and the front planar section 118 may be 1½ inches wide. It is understood that each of these dimensions for the sections 104, 106 and 110 through 114 may vary in alternative embodiments, both proportionately and disproportionately with respect to each other. In embodiments of the present invention, the central diaphragm 102 may be formed of 7-gauge sheet steel (0.1875 inches). Other gauges, such as for example 10-gauge sheet steel, and other materials of comparable strength and rigidity may be used in alternative embodiments. One such alternative material may be expanded metal.

In a preferred embodiment, the rear planar sections 110, 112 may be coplanar with a back edge of the diaphragm 102 and front planar section 118 may be coplanar with a front edge of the diaphragm 102 so that the corrugation 108 traverses the entire depth of the central diaphragm. As explained in greater detail below, the corrugation 108 need not traverse the entire depth of the central diaphragm in alternative embodiments.

Figure 5:
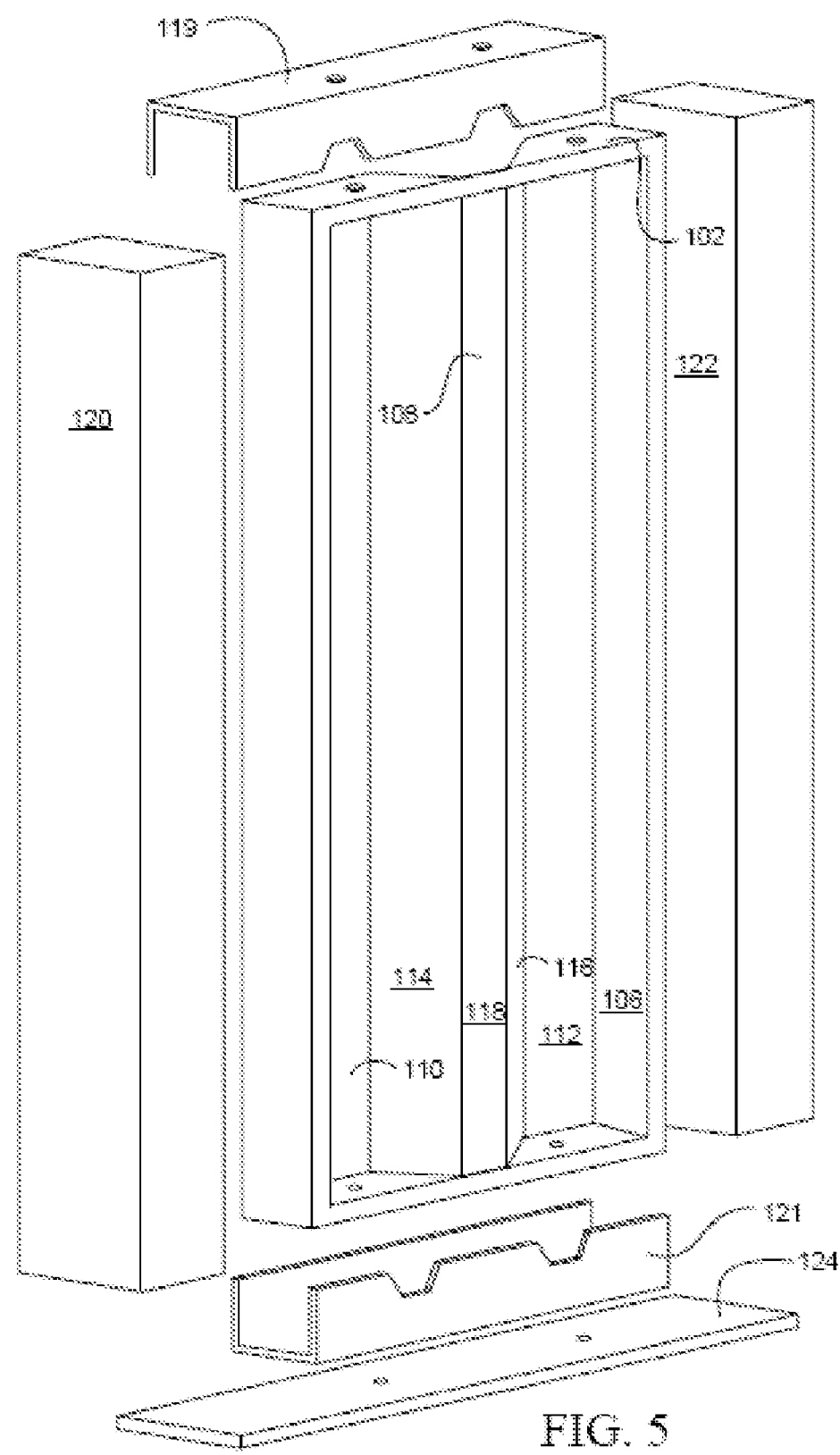
FIG. 5 is an exploded perspective view of the prefabricated shearwall according to the present invention.
Figure 6:
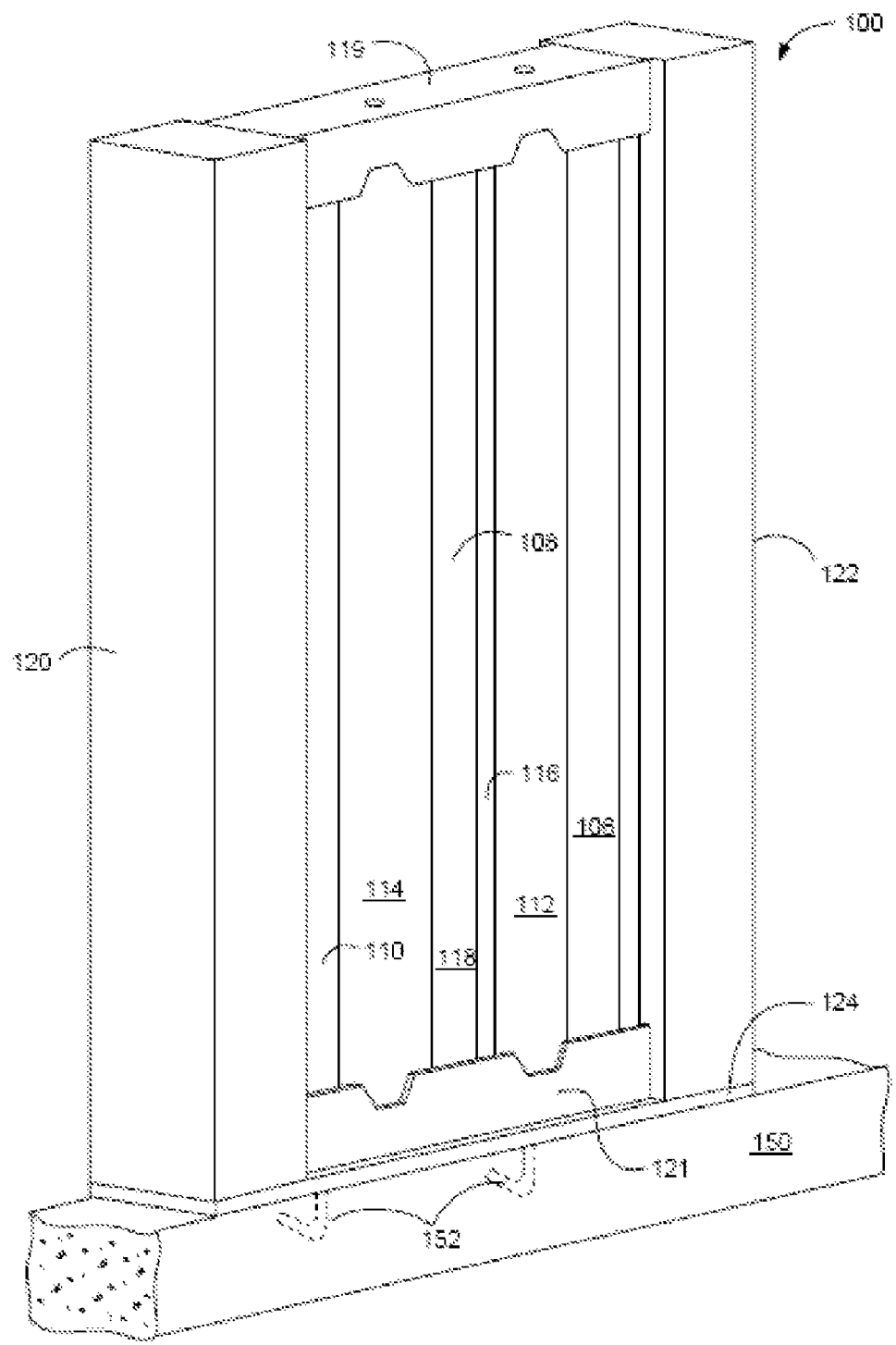
FIG. 6 is a perspective view of a shearwall according to the present invention mounted to an underlying support surface such as a building foundation.

Referring now to FIGS. 5 and 6, when installed into a wall, the top and bottom edges 101 and 103 of the central diaphragm lie within U-shaped channels 119 and 121, respectively. In embodiments of the invention, both U-shaped channels may be formed of ¼ inch steel plate bent into a U shape. Each channel 119, 121 may be as long as the central diaphragm is wide. The uppermost surface of channel 119 and the lowermost surface of channel 121 shown in FIG. 5 may be 3 inches wide. The front and back edges of the channels may extend a few inches over the top and bottom of the central diaphragm, and the front and back edges may include scallops to facilitate fastening of the bolts securing the central diaphragm to the top plate and underlying surface as explained hereinafter. The U-shaped channels 119, 121 may be omitted in alternative embodiments, in which case the top and bottom edges of the central diaphragm may attach directly to the top and bottom plates of the wall.

In embodiments of the present invention, the shearwall 100 may further include a pair of reinforcing chords 120 and 122 affixed to the end sections 104 and 106, respectively. The chords may be formed of wood, such as for example sawn lumber from lumber groups including spruce-pine-fir, Douglas fir-larch, hem-fir and southern pine. The chords 120, 122 may alternatively be formed of engineered lumber, such as glulam and wood composites. Other types of wood are contemplated. The chords may have a height equal to that of the central diaphragm 102 and channels 119 and 121 together, and may be 4 inches wide by 2 inches deep. Various affixing mechanisms may be used to affix the chords to the central diaphragm, such as for example a plurality of ¼ inch×1½ inch Simpson Strong-Drive® screws. Other types of screws and affixation methods are contemplated. The screws in one embodiment may be provided in each chord along a single column and spaced apart 6 to 12 inches from each other. It is understood that the screws may be provided in more than one column, or not aligned in a column, down the length of the chords 120, 122, and may be spaced apart more or less than 6 to 12 inches in alternative embodiments.

Affixation of the chords to the central diaphragm as described above further improves the resistance of shearwall 100 to lateral forces. While a single chord is shown on each side of the central diaphragm, it is understood that more than one chord may be provided at each end. For example, 2 to 4 (or more) such chords may be affixed together and mounted to each side of the central diaphragm. It is also understood that chords of less than 2 inches deep and 4 inches wide may be used in alternative embodiments. Sheathing (not shown) may be affixed over the front and back surface of the central diaphragm and chords, and affixed to the chords by a variety of affixing mechanisms including Simpson Strong-Drive® screws. It is further understood that the chords 120, 122 may be omitted in alternative embodiments.

Shearwall 100 further includes a sill plate 124 affixed to the bottom of the central diaphragm. This allows shearwall 100 to have a lower load bearing surface with a sufficient surface area to allow distribution of the shearwall compressive forces over a sufficiently large area on the underlying floor diaphragm or foundation. If the compressive forces from the shearwall are concentrated, for example in a situation where the bottom plate is small or is shaped with channels so that only a portion of the bottom plate lies in contact with the underlying support surface, the resulting compressive forces can damage or cause failure in the underlying support surface.

Accordingly, sill plate 124 is provided as a flat plate with a relatively large surface area. The plate 124 has a length which is preferably equal to that of the central diaphragm and the chords 120 and 122 together, and a width that is equal to the width of the chords 120 and 122. This width dimension is greater than the width of the U-shaped channel 121 in embodiments of the present invention. In such embodiments, this provides a sill plate which is 16 inches long and 4 inches wide. It is understood that the length and/or width of plate 124 may be larger in alternative embodiments. For example, in embodiments of the invention not including chords 120, 122 and/or channel 121, the footprint of the sill plate may be the same size as the footprint of the central diaphragm.

Sill plate is also rigid enough to allow even distribution of any localized compressive forces from the shearwall 100. In one embodiment of the present invention, the sill plate 124 is formed of ½ inch thick steel. In embodiments of the invention, sill plate 124 may be affixed within channel 121 by affixation methods such as welding. The rigidity of the sill plate 124 as well as the rigid affixation of the sill plate 124 to the channel 121 further prevents buckling of the shearwall under laterally applied loads. It is understood that sill plate 124 may have thicknesses other than ½ inch in alternative embodiments.

It is a further feature of the sill plate 124 to underlie the chords 120, 122, thereby preventing their contact with the underlying support surface. In embodiments of the present invention where shearwall 100 is mounted on a foundation, the sill plate 124 isolates the chords from wetness and moisture from the foundation which may otherwise weaken and erode the chords. The provision of the sill plate 124 under the chords also allows the compressive forces exerted specifically by the chords to be evenly distributed over the sill plate and onto the underlying support surface as described above.

Referring now specifically to FIG. 6, there is shown a perspective view of the shearwall 100 mounted on an underlying support surface 150. In the embodiment shown, underlying support surface 150 comprises a concrete building foundation, but it is understood that underlying support surface 150 may be any surface on which a conventional shearwall may be located, including for example a floor diaphragm on the building foundation or a floor diaphragm on a top plate of a lower floor. The shearwall is fastened to the underlying support surface 150 by means of anchors 152 (partially shown in FIG. 6) protruding up through aligned holes formed in the sill plate 124, channel 121 and the bottom of the central diaphragm 102. The bolts are then fastened over threaded ends of anchors 152 to anchor the shearwall to the underlying support surface. It is understood that shearwall 100 may be anchored to the underlying support surface by other anchoring mechanisms in alternative embodiments, such as for example by strap anchors, mudsill anchors, retrofit bolts, foundation plate holdowns, straps, ties, nails, screws, framing anchors, ties, plates, straps or a combination thereof.

Shearwall 100 may similarly include openings in the top edge of the central diaphragm 102 and channel 119 for affixation to a top plate of a wall as by bolts or other anchoring mechanisms described above. As also indicated above, shearwall 100 is prefabricated so that it may be easily located within a wall in any desired location simply by affixing the shearwall to the underlying support surface and top plate. The shearwall may be installed initially during construction of a building, or retrofit after completion of construction.

Shearwall 100 including corrugated central diaphragm 102 is capable of withstanding greater lateral loads in comparison to conventional shearwalls. Moreover, the corrugation(s) improve the ductility of the shearwall in the lateral direction.

Up to this point, the corrugation 108 has been disclosed as having constant dimensions between the top edge 101 and the bottom edge 103. That is, the intersection between the rear planar section 110 and angled section 114, and the intersection between the rear planar section 112 and angled section 116, form lines that extend vertically between the top and bottom edges parallel to each other. Similarly, the intersections between the angled sections 114, 116 and the front planar section 118 form lines that extend vertically between the top and bottom edges parallel to each other.

Figure 7:
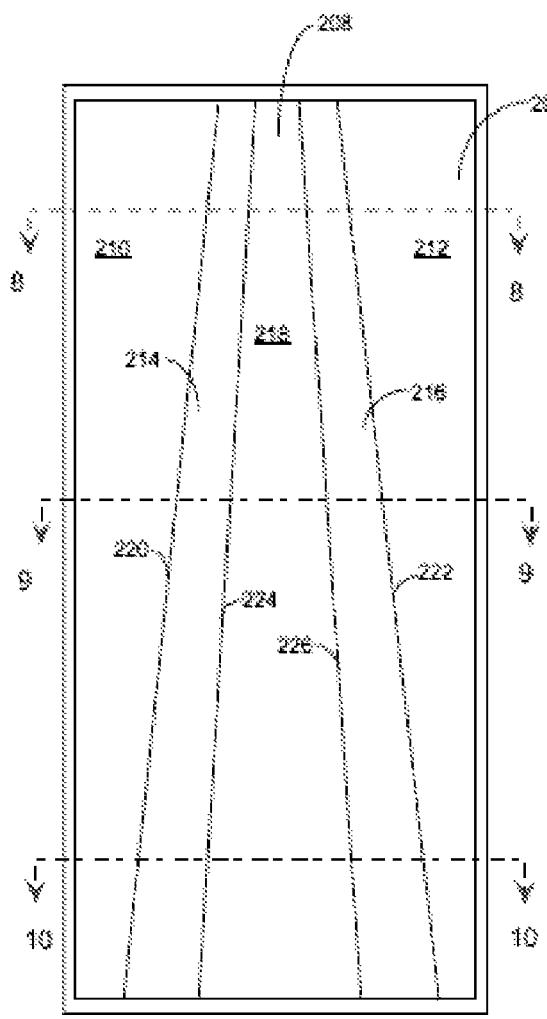
FIG. 7 is a front view of a shearwall according to an alternative embodiment of the present invention where the size and shape of the corrugation changes from the top edge to the bottom edge of the shearwall.
Figure 8:
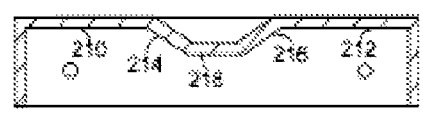
FIG. 8 is a cross-sectional view through line 8-8 of FIG. 7.
Figure 9:
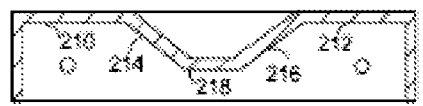
FIG. 9 is a cross-sectional view through line 9-9 of FIG. 7.
Figure 10:
FIG. 10 is a cross-sectional view through line 10-10 of FIG. 7.

In an alternative embodiment of the present invention shown in the front view of FIG. 7 and the cross-sectional views of FIGS. 8-10, the intersections between the various sections forming the corrugation need not be vertical or parallel to each other. In particular, the central diaphragm 202 shown in FIG. 7 includes a corrugation 208 defined by rear planar sections 210 and 212, angled sections 214 and 216, and front planar section 218. The intersection lines 220 and 222 between the rear planar sections and the angled sections slope inward from the bottom edge to the top edge. Similarly, the intersection lines 224 and 226 between the angled sections and the front planar section slope inward from the bottom edge to the top edge. The result, as shown in the cross-sections of FIGS. 8 through 10 along the length of the central diaphragm, is that the corrugation gets larger from the top edge to the bottom edge.

Figure 11:
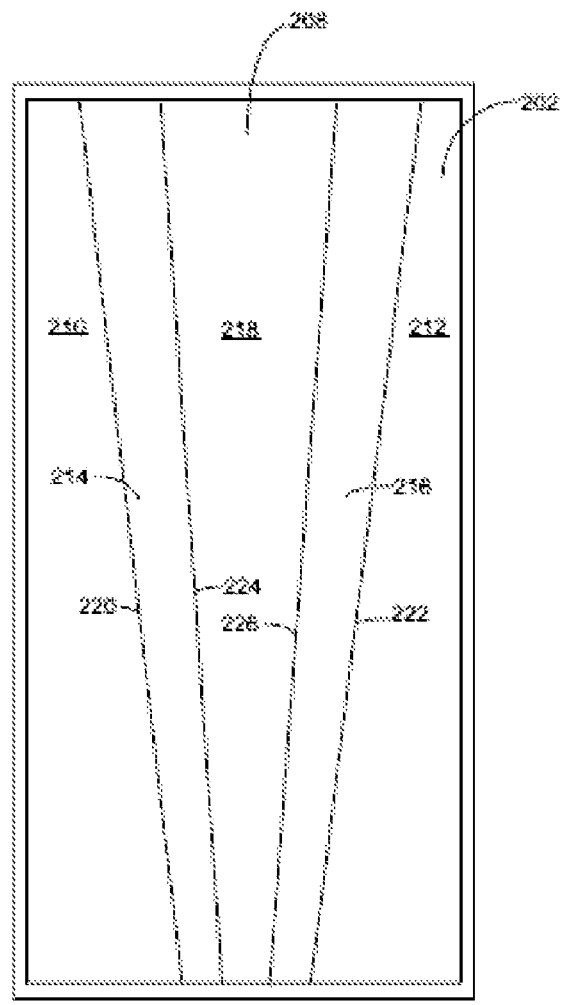
FIG. 11 is a front view of a shearwall according to a further alternative embodiment of the present invention similar but inverted with respect to FIG. 7.
Figure 12:
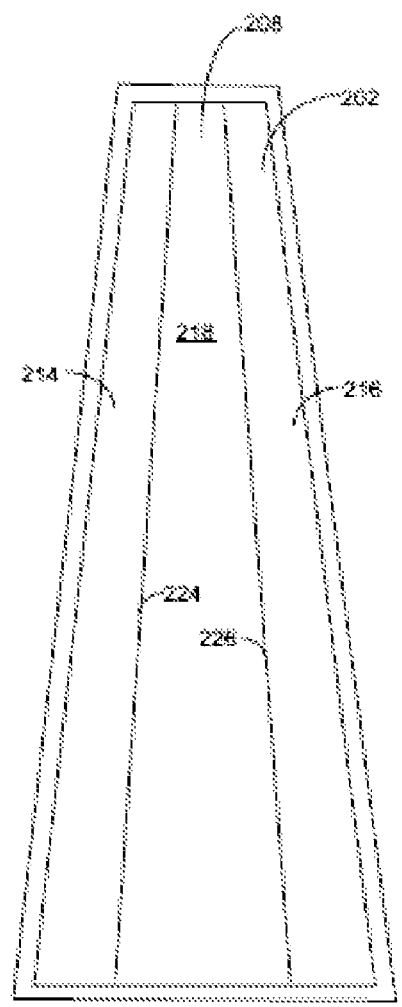
FIG. 12 is a front view of a shearwall according to a further alternative embodiment of the present invention where the size and shape of the shearwall changes from the top edge to the bottom edge of the shearwall.
Figure 13:
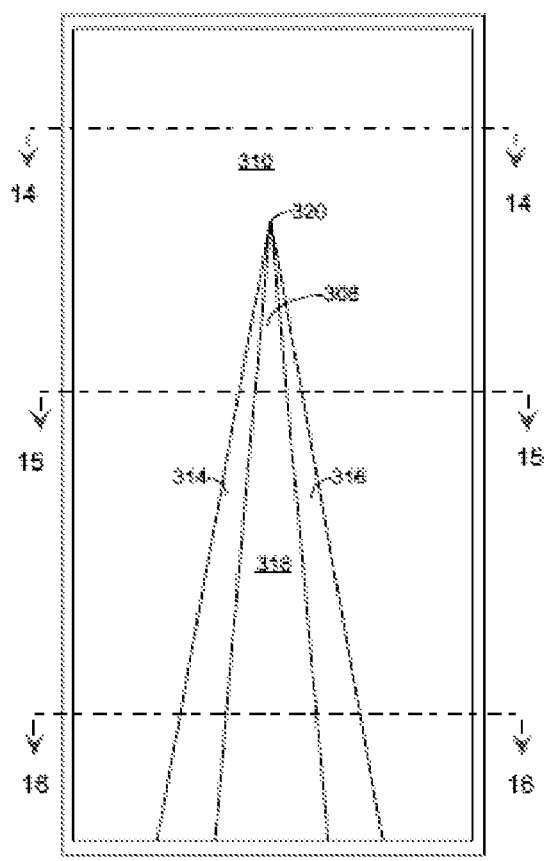
FIG. 13 is a front view of a shearwall according to a further alternative embodiment of the present invention where the size and shape of the corrugation changes from the top edge to the bottom edge of the shearwall.
Figure 14:
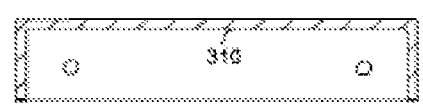
FIG. 14 is a cross-sectional view through line 14-14 of FIG. 13.
Figure 15:
FIG. 15 is a cross-sectional view through line 15-15 of FIG. 13.
Figure 16:
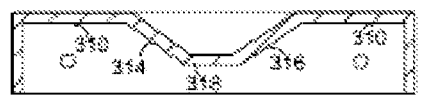
FIG. 16 is a cross-sectional view through line 16-16 of FIG. 13.

FIG. 11 is similar to FIG. 7 but inverted so that the intersection lines 220 and 222 between the rear planar sections and the angled sections slope outward from the bottom edge to the top edge. Similarly, the intersection lines 224 and 226 between the angled sections and the front planar section slope outward from the bottom edge to the top edge. FIG. 12 is similar to FIG. 7 but rear planar sections 210 and 212 are omitted so that the size and shape of the shearwall changes from the top edge to the bottom edge of the shearwall.

In addition to lateral force resisting characteristics of the shearwall 100 shown in FIGS. 3-6, providing the bends between the various sections at angles that slope inward or outward from bottom to top provides even greater lateral force resistance, as there is a lateral component to the various bends between the sections. The lateral component to the various bends further resists movement in the lateral direction, and further improves the resistance of the shearwall to lateral loads.

Although not shown in FIGS. 7 through 12, the shearwall shown therein may include the channels 119, 121, the chords 120, 122 and the sill plate 124 described above.

FIGS. 13 through 16 are similar to FIGS. 7 through 10, except that the corrugation 308 of FIGS. 11 through 14 does not extend the entire length between the top and bottom edges of the central diaphragm. Instead, the corrugation begins at the bottom edge and the intersection lines between the various sections 310, 314, 316 and 318 slope inward until the corrugation ends at a point 320 between the top and bottom edges. Again, the shearwall of FIGS. 13 through 16 would preferably include the channels 119, 121, the chords 120, 122 and the sill plate 124 described above. However, it is contemplated that the chords and/or the sill plate may be omitted in alternative embodiments.

Figure 17:
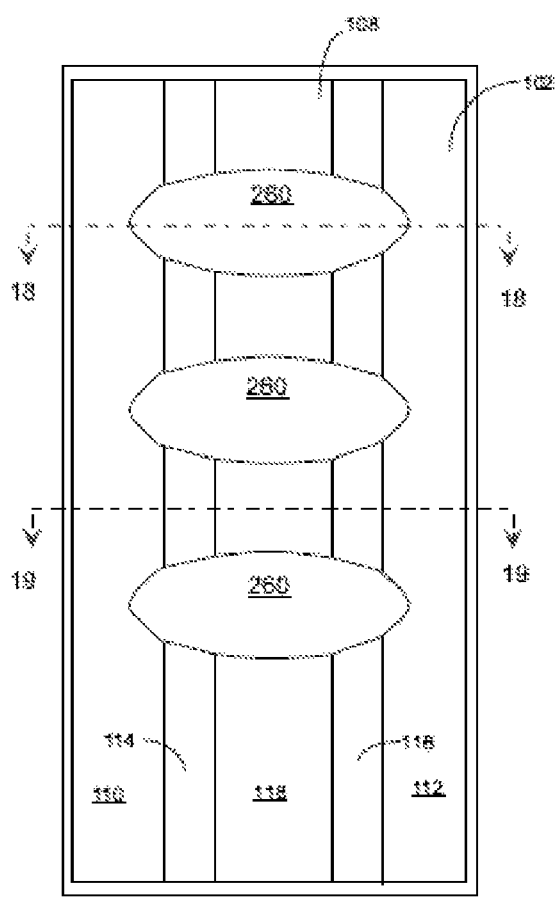
FIG. 17 is a front view of a shearwall according to a further alternative embodiment of the present invention where the shearwall has cutout sections in the surface of the central diaphragm.
Figure 18:
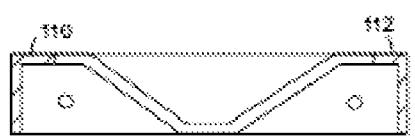
FIG. 18 is a cross-sectional view through line 18-18 of FIG. 17.
Figure 19:
FIG. 19 is a cross-sectional view through line 19-19 of FIG. 17.

In a further alternative embodiment of the present invention shown in FIGS. 17 though 19, the central diaphragm may include apertures 260 provided through the surface of the diaphragm. The apertures may be various shapes and sizes in alternative embodiments, and may be formed in the diaphragm before or after the corrugation is formed. The shapes may be oval, oblong, circular, quadrilateral, polygon or irregular from the front view in alternative embodiments. The size may also vary such that the aperture 260 extends as far out as the rear planar surfaces 210, 212 (as shown in FIG. 17), out as far as the angled sections 214, 216, or be provided only through the front planar section 218. Moreover, while three such apertures 260 are shown in FIG. 17, the number of apertures 260 may be less than or greater than three in alternative embodiments. The apertures can be used to reduce the overall strength of the central diaphragm in such a way so that the shearwall 100 yields under lateral loads before an underlying support structure such as the foundation.

Figure 20:
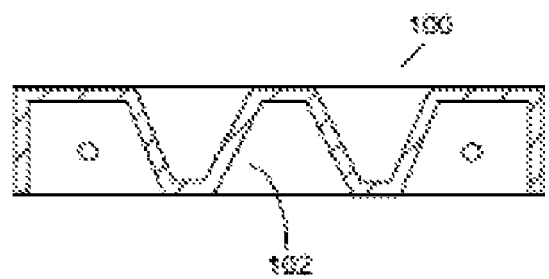
FIGS. 20 through 24 are cross-sectional views of alternative embodiments of the central diaphragm which may be used in the present invention.
Figure 21:
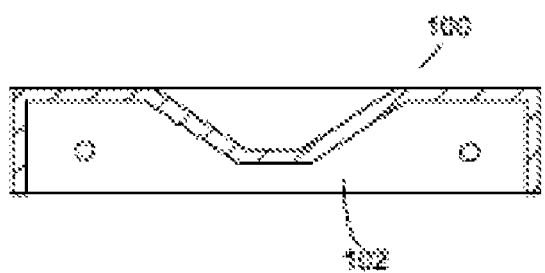

Up to this point, embodiments of the present invention have been shown as including a central diaphragm with a single corrugation 108, 208 or 308 as shown in FIGS. 3 through 19. However, it is understood that the central diaphragm may have a non-planar cross-section in shapes other than a single corrugation in alternative embodiments of the invention. For example, as shown in the cross-sectional view of FIG. 20, the central diaphragm may include a plurality of corrugations. While FIG. 20 shows 2 such corrugations, it is understood that more than 2 corrugations may be provided in further alternative embodiments. FIG. 21 shows a further embodiment where there is a single corrugation of constant shape from the top edge to the bottom edge, but the front planar section 218 lies between the planes of the front and back edge of the central diaphragm. It is understood that the embodiments of FIGS. 20 and 21 may be combined so that the central diaphragm includes a plurality of corrugations, each having a front planar section which lies between the planes of the front and back edge of the central diaphragm. The embodiments of FIGS. 20 and 21 may also be combined with the embodiments of FIGS. 7 through 19.

Figure 22:
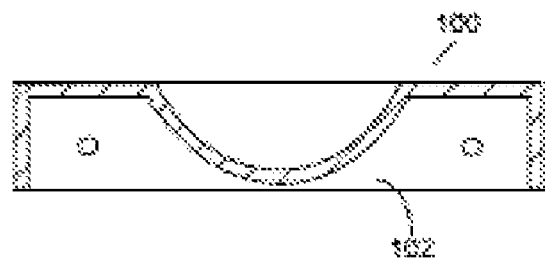
Figure 23:
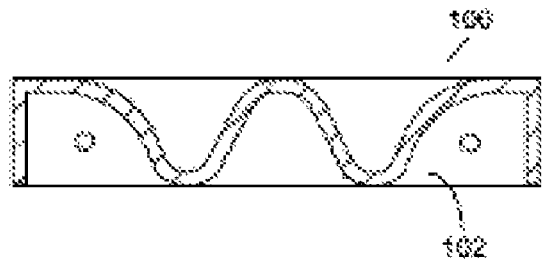
Figure 24:
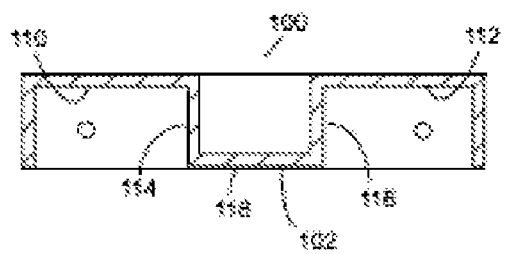

As shown in FIG. 22, a further alternative embodiment of the central diaphragm may include a corrugation formed by a combination of straight and rounded sections. As a further alternative shown in FIG. 23, the central diaphragm may include a plurality of rounded corrugations. FIG. 24 illustrates a further embodiment where the angled sections 114, 116 are formed at right angles to the rear planar sections 112, 114 and the front planar section 118. These embodiments may be combined with any of the embodiments shown in FIGS. 7 through 19.

Figure 25:
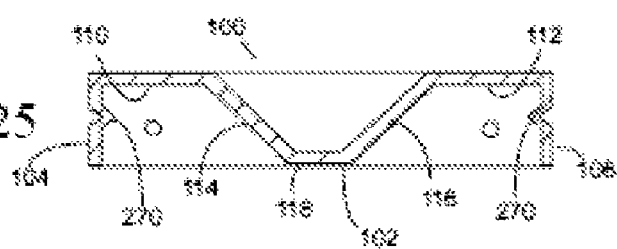
FIG. 25 is a cross-sectional view from the same perspective as FIGS. 20 through 24, further including an embossment.
Figure 26:
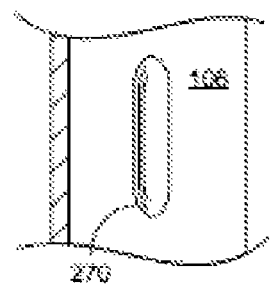
FIG. 26 is a side view of an embossment shown in FIG. 25.

FIGS. 25 and 26 show a further embodiment of the present invention including one or more embossments 270 formed in one or more surfaces of the central diaphragm to add strength to the diaphragm. While shown in end section 106, it is understood that the one or more embossments 270 may alternatively or additionally be formed in opposite end section 104, or sections 112 through 118, in alternative embodiments. As shown in FIG. 26, when vertically oriented, the embossment(s) 270 may extend over a portion of sections 104, 106, and/or 112 through 118. Alternatively, the embossment(s) may extend substantially the entire length of the sections. While shown as being vertically oriented in FIGS. 25 and 26, it is understood that the one or more embossments may be oriented differently in alternative embodiments. For example, the embossments may be provided horizontally or at an angle between the horizontal and vertical. Moreover, the embossments may be provided in a cross-hatched or herringbone configuration. The one or more embossments 270 may be used in any of the embodiments shown in FIGS. 7 through 24.

Figure 27:
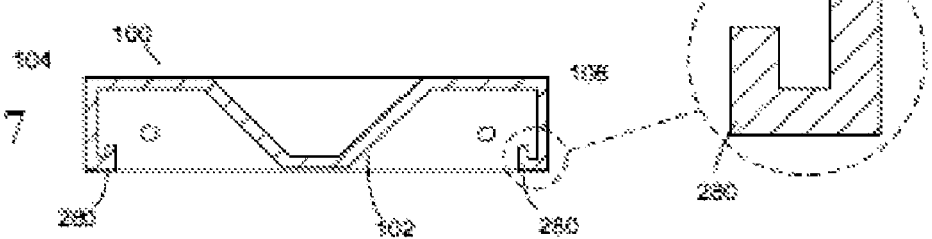
FIG. 27 is a cross-sectional view from the same perspective as FIGS. 20 through 24, further including an inwardly facing stiffening lip.
Figure 28:
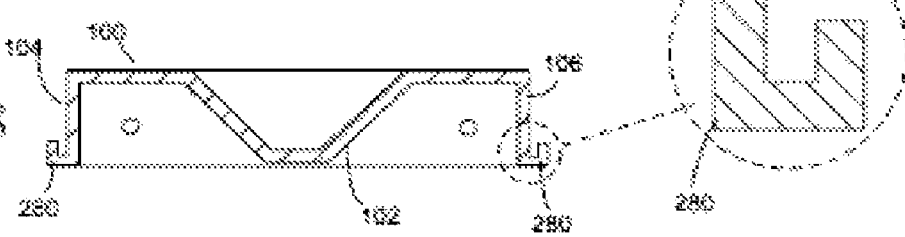
FIG. 28 is a cross-sectional view from the same perspective as FIGS. 20 through 24, further including an outwardly facing stiffening lip.

FIGS. 27 and 28 show a further embodiment of the present invention including stiffening lips 280 formed in the horizontally oriented edges of end sections 104 and 106. The lips 280 may be formed inwardly as shown in FIG. 27, or the lips 280 may be outwardly as shown in FIG. 28. The stiffening lips 280 may be provided to add additional strength to the diaphragm 102, and may be used in any of the embodiments shown in FIGS. 7 through 26.

Figure 29:
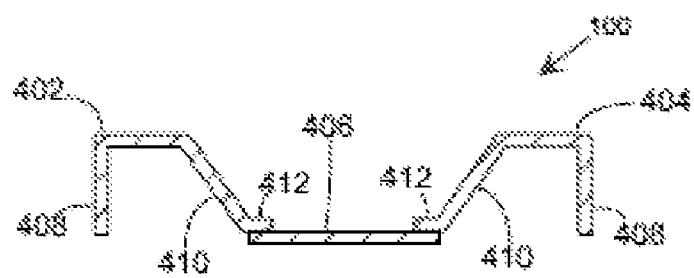
FIGS. 29 and 30 are cross-sectional views of a further alternative embodiment of the present invention.
Figure 30:
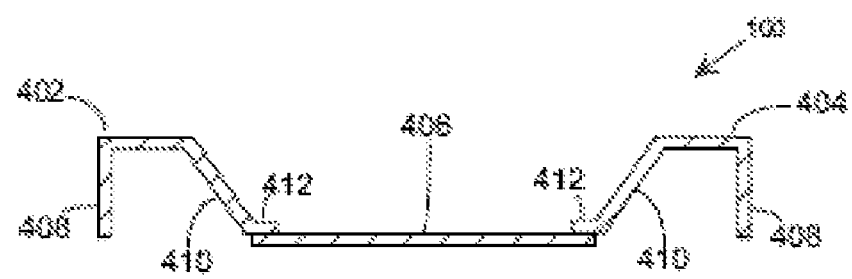
Figure 31:
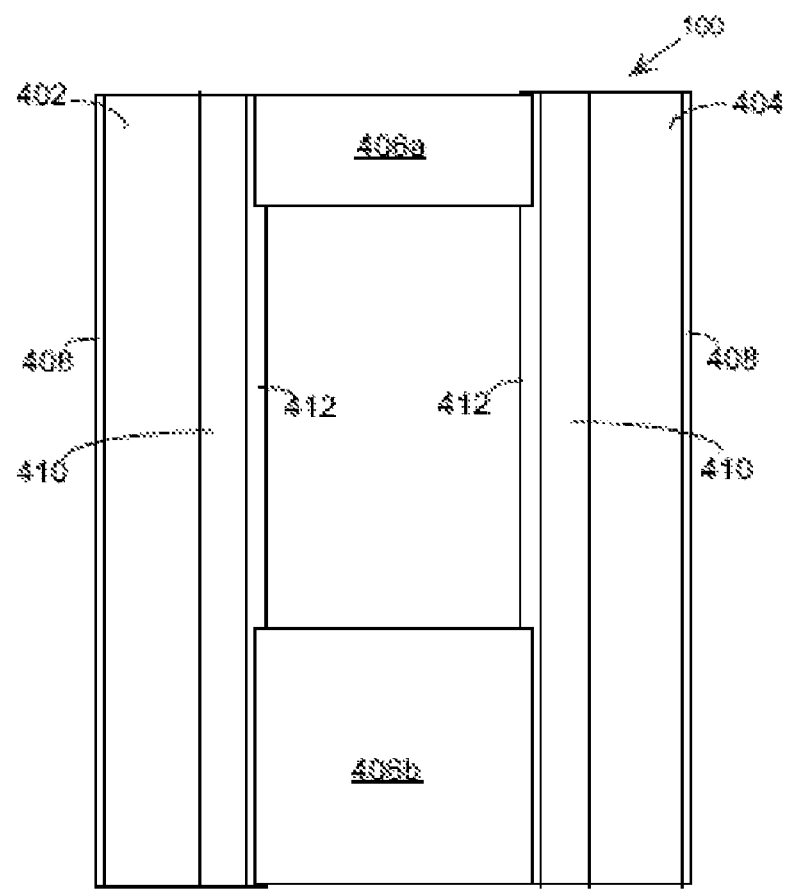
FIG. 31 is a front view of the embodiment of the present invention shown in FIG. 29 or 30.

FIGS. 29 through 31 illustrate a further alternative embodiment of the present invention. According to this embodiment, the central diaphragm 102 may be comprised of separate end members 402 and 404, and a separate central section 406. Each end member may include end sections 406, rear planar sections 408 and angled sections 410 similar to the end sections, rear planar sections and angled sections described above with respect to other embodiments. The end members may optionally have a portion of a front planar section 412 similar to a portion of the front planar section described above with respect to other embodiments. The central section 406 may be a single unitary piece of material, such as metal, that extends the length of the diaphragm and is affixed to the angled sections 410 at the front plane of the diaphragm, or to the portions of the front planar sections 412 (as shown). The central section may be affixed by welding or other known affixation methods.

As an alternative to a single unitary piece of material that extends the length of the diaphragm, the central section 406 may be comprised of more than one piece as shown in FIG. 31. In such an embodiment, the central section may include a section 406a at a top of the diaphragm and a section 406b at a bottom of the diaphragm. Though not critical to the present invention, the section 406a may extend down 12 inches from the top of the diaphragm and the section 406b may extend up 36 inches from the bottom of the diaphragm. It is understood that the lengths of sections 406a and 406b may vary in alternative embodiments, both proportionately and disproportionately to each other.

The embodiment shown in FIGS. 29 through 31 allows the overall width of the shearwall 100 to be easily provided to different widths in the field simply by using a central section of differing widths. A shorter width central section (FIG. 29) will provide one overall width, while a larger width central section (FIG. 30) will provide another overall width. Thus, a shearwall 100 of the precisely needed width may be easily and quickly formed. The embodiment shown in FIGS. 29-31 may be used in conjunction with the embodiments disclosed above with respect to FIGS. 7 through 28.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A shearwall construction, comprising:
a shearwall, comprising:
a central diaphragm, including:
a top edge and a bottom edge generally defining a height of said central diaphragm,
first and second ends, extending between the top and bottom edges, generally defining a width of said central diaphragm, the first and second ends further defining a depth of the central diaphragm perpendicular to the height and width of the central diaphragm, the first and second ends oriented parallel to each other to provide a rectangular footprint of the central diaphragm;
a corrugated section extending between said top edge and said bottom edge, attached to and extending from said first and second ends, said corrugated section forming at least one corrugation having holes therein;
a pair of wooden chords including a first wooden chord affixed to the first end and a second wooden chord affixed to the second end, the chords extending along the height and depth of the central diaphragm; and
a bottom plate mounted at the bottom edge of the central diaphragm, the bottom plate extending along the depth of the central diaphragm and the width of the central diaphragm plus the pair of chords, support of the pair of chords on the bottom plate preventing moisture entering the pair of chords from a surface on which the shearwall is supported, the bottom plate including a pair of holes for receiving anchors;
a concrete foundation as the surface on which the shearwall is supported; and
a pair of anchors fit through the holes in the bottom plate anchoring the shearwall to the concrete foundation.

2. A shearwall construction as recited in claim 1, wherein the corrugated section forms one and only one corrugation.

3. A shearwall construction as recited in claim 1, wherein the first and second ends each include
one stiffening lip extending at an angle to the first and second ends.

4. A shearwall construction as recited in claim 1, wherein the corrugated section forms two and only two corrugations.

5. A shearwall construction, comprising:
a shearwall, comprising:
a central diaphragm, including:
a top edge and a bottom edge generally defining a height of said central diaphragm,
first and second ends, extending between the top and bottom edges, generally defining a width of said central diaphragm, the first and second ends further defining a depth of the central diaphragm perpendicular to the height and width of the central diaphragm, the first and second ends oriented parallel to each other to provide a rectangular footprint of the central diaphragm;
a corrugated section extending between said top edge and said bottom edge, attached to and extending from said first and second ends, said corrugated section forming at least one corrugation having holes therein;
a pair of wooden chords including a first wooden chord affixed to the first end and a second wooden chord affixed to the second end, the chords extending along the height and depth of the central diaphragm; and
a bottom plate mounted at the bottom edge of the central diaphragm, the bottom plate extending along the depth of the central diaphragm and the width of the central diaphragm plus the pair of chords, support of the pair of chords on the bottom plate preventing moisture entering the pair of chords from a surface on which the shearwall is supported, the bottom plate including a pair of holes for receiving anchors;
a wooden surface as the surface on which the shearwall is supported; and
a pair of anchors fit through the holes in the bottom plate anchoring the shearwall to the wooden surface.

6. A shearwall construction as recited in claim 5, wherein the corrugated section forms one and only one corrugation.

7. A shearwall construction as recited in claim 5, wherein the corrugated section forms two and only two corrugations.

8. A shearwall construction, comprising:
a shearwall, comprising:
a central diaphragm, including:
a top edge and a bottom edge generally defining a height of said central diaphragm,
first and second ends, extending between the top and bottom edges, generally defining a width of said central diaphragm, the first and second ends further defining a depth of the central diaphragm perpendicular to the height and width of the central diaphragm, the first and second ends oriented parallel to each other to provide a rectangular footprint of the central diaphragm;
a corrugated section extending between said top edge and said bottom edge, attached to and extending from said first and second ends, said corrugated section forming at least one corrugation having holes therein;
a pair of wooden chords including a first wooden chord affixed to the first end and a second wooden chord affixed to the second end, the chords extending along the height and depth of the central diaphragm; and
a bottom plate mounted at the bottom edge of the central diaphragm, the bottom plate extending along the depth of the central diaphragm and the width of the central diaphragm plus the pair of chords, support of the pair of chords on the bottom plate preventing moisture entering the pair of chords from a surface on which the shearwall is supported, the bottom plate including a pair of holes for receiving anchors for anchoring the shearwall to the surface.

9. A shearwall construction as recited in claim 8, wherein the corrugated section forms one and only one corrugation.

10. A shearwall construction as recited in claim 8, wherein the corrugated section forms two and only two corrugations.

11. A method of building a construction resisting shear loads, comprising the steps of:
(a) prefabricating a shearwall remotely from a site of the construction, the shearwall including:
a central diaphragm, including:
a top edge and a bottom edge generally defining a height of said central diaphragm,
first and second ends, extending between the top and bottom edges, generally defining a width of said central diaphragm, the first and second ends further defining a depth of the central diaphragm perpendicular to the height and width of the central diaphragm, the first and second ends oriented parallel to each other to provide a rectangular footprint of the central diaphragm;
a corrugated section extending between said top edge and said bottom edge, attached to and extending from said first and second ends, said corrugated section forming at least one corrugation having holes therein; and
a pair of wooden chords including a first wooden chord affixed to the first end and a second wooden chord affixed to the second end, the chords extending along the height and depth of the central diaphragm;
a bottom plate mounted at the bottom edge of the central diaphragm, the bottom plate extending along the depth of the central diaphragm and the width of the central diaphragm plus the pair of chords, support of the pair of chords on the bottom plate preventing moisture entering the pair of chords from a surface on which the shearwall is supported, the bottom plate including a pair of holes for receiving anchors;
(b) mounting the shearwall on a support surface at the construction site via anchors provided through the holes in the bottom plate; and
(c) affixing at least one of the chords to an adjacent wall at the construction site.

12. A method of building a construction resisting shear loads, comprising the steps of:
(a) prefabricating a shearwall remotely from a site of the construction, the shearwall including:
a central diaphragm, including:
a top edge and a bottom edge generally defining a height of said central diaphragm,
first and second ends, extending between the top and bottom edges, generally defining a width of said central diaphragm, the first and second ends further defining a depth of the central diaphragm perpendicular to the height and width of the central diaphragm, the first and second ends oriented parallel to each other to provide a rectangular footprint of the central diaphragm;
a corrugated section extending between said top edge and said bottom edge, attached to and extending from said first and second ends, said corrugated section forming at least one corrugation having holes therein; and
a pair of wooden chords including a first wooden chord affixed to the first end and a second wooden chord affixed to the second end, the chords extending along the height and depth of the central diaphragm;
a bottom plate mounted at the bottom edge of the central diaphragm, the bottom plate extending along the depth of the central diaphragm and the width of the central diaphragm plus the pair of chords, support of the pair of chords on the bottom plate preventing moisture entering the pair of chords from a surface on which the shearwall is supported, the bottom plate including a pair of holes for receiving anchors.

13. The method of claim 12, further comprising the step (b) of transporting the prefabricated shearwall to the site of the construction.

14. The method of claim 12, further comprising the step (c) of mounting the shearwall on a support surface via anchors provided through the holes in the bottom plate.

15. The method of claim 14, said step (c) of mounting the shearwall on a support surface comprising the step of mounting the shearwall on a concrete foundation.

16. The method of claim 14, further comprising the step (d) of affixing at least one of the chords to an adjacent wall.

* * * * *